(12) United States Patent
Gagnon

(10) Patent No.: US 6,666,044 B2
(45) Date of Patent: Dec. 23, 2003

(54) SELF-CONTAINED SILICONE-GEL INSULATED CONTAINER

(76) Inventor: François Gagnon, 1466 Joy, Mascouche, QBC (CA), J7L 2K3

( * ) Notice: Subject to any disclaimer, the term of this patent is extended or adjusted under 35 U.S.C. 154(b) by 0 days.

(21) Appl. No.: 10/359,606

(22) Filed: Feb. 7, 2003

(65) Prior Publication Data

US 2003/0150237 A1 Aug. 14, 2003

Related U.S. Application Data

(60) Provisional application No. 60/354,972, filed on Feb. 11, 2002.

(51) Int. Cl.[7] .............................................. F25D 11/04
(52) U.S. Cl. ....................................... 62/438; 62/457.2
(58) Field of Search ............................ 62/457.1, 457.2, 62/457.3, 457.4, 457.6, 457.7, 371, 530

(56) References Cited

U.S. PATENT DOCUMENTS

| 4,688,398 A | 8/1987 | Baek |
|---|---|---|
| 5,035,122 A | 7/1991 | Oogjen |
| 5,181,612 A | 1/1993 | Liu |
| 5,701,757 A | 12/1997 | Heverly |
| 5,706,969 A | 1/1998 | Yamada et al. |
| 5,709,914 A * | 1/1998 | Hayes ........................ 428/35.1 |
| 6,070,718 A * | 6/2000 | Drabwell ..................... 206/216 |
| 6,085,535 A * | 7/2000 | Richmond et al. ............ 62/258 |
| 6,401,479 B2 | 6/2002 | Garrett |
| 6,467,299 B1 * | 10/2002 | Coetzee ..................... 62/457.2 |

* cited by examiner

Primary Examiner—Melvin Jones

(57) ABSTRACT

A self-contained insulated container for maintaining an item at a predetermined temperature. The container has an inner sidewall and an outer sidewall, which are spaced apart from each other and closed off to define an insulating chamber therebetween. The container includes a storage area, for receiving the item therein, which is defined by the inner sidewall. The storage area is at a first storage temperature. The insulating chamber is substantially filled with a first insulating material, which is a aqueous silicone-gel mixture. The first insulating material is at a first insulating temperature. The storage area attains a second storage temperature after the item is placed therein and the first insulating material maintains the second storage temperature and the item at the predetermined temperature for a storage period.

32 Claims, 4 Drawing Sheets

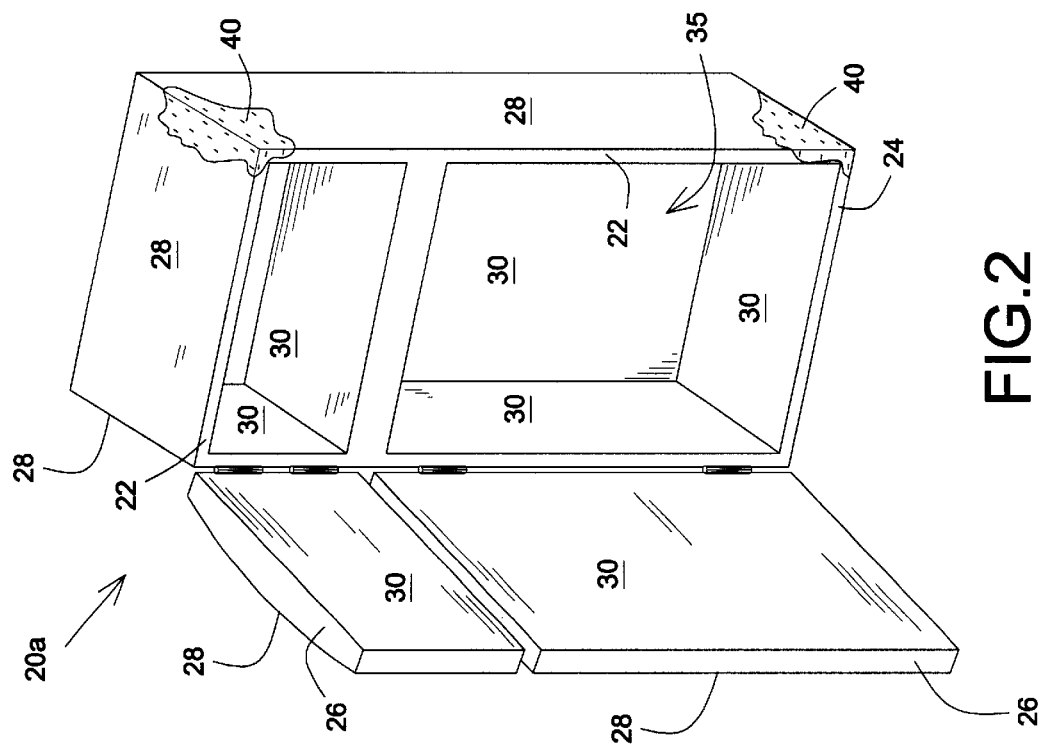
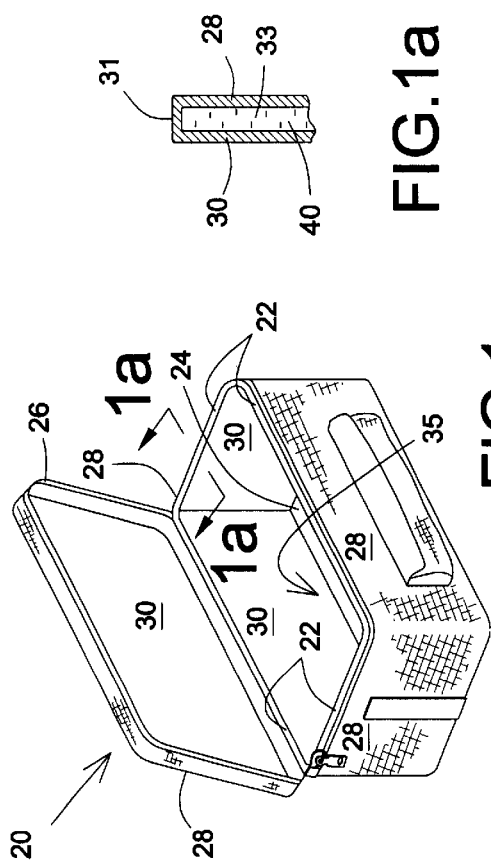
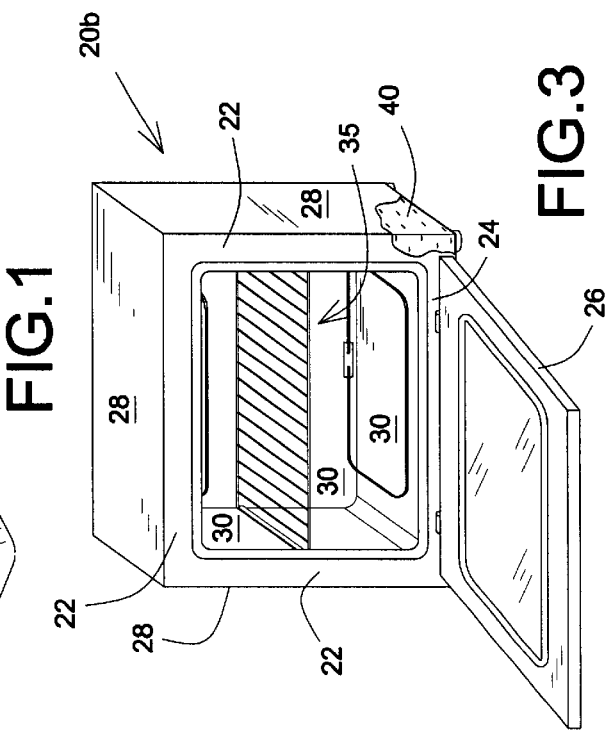

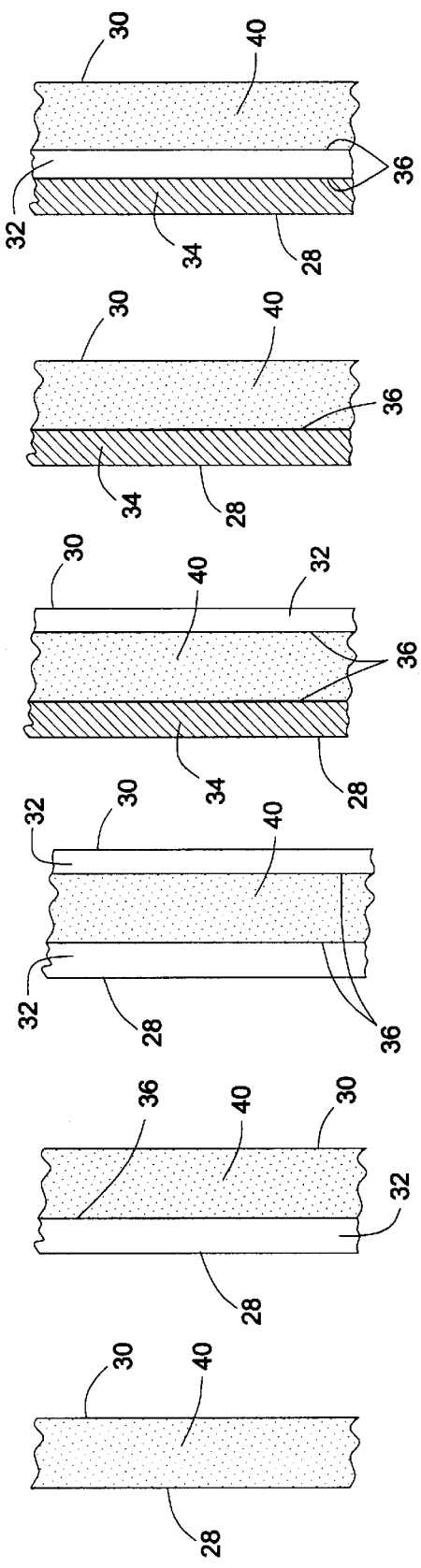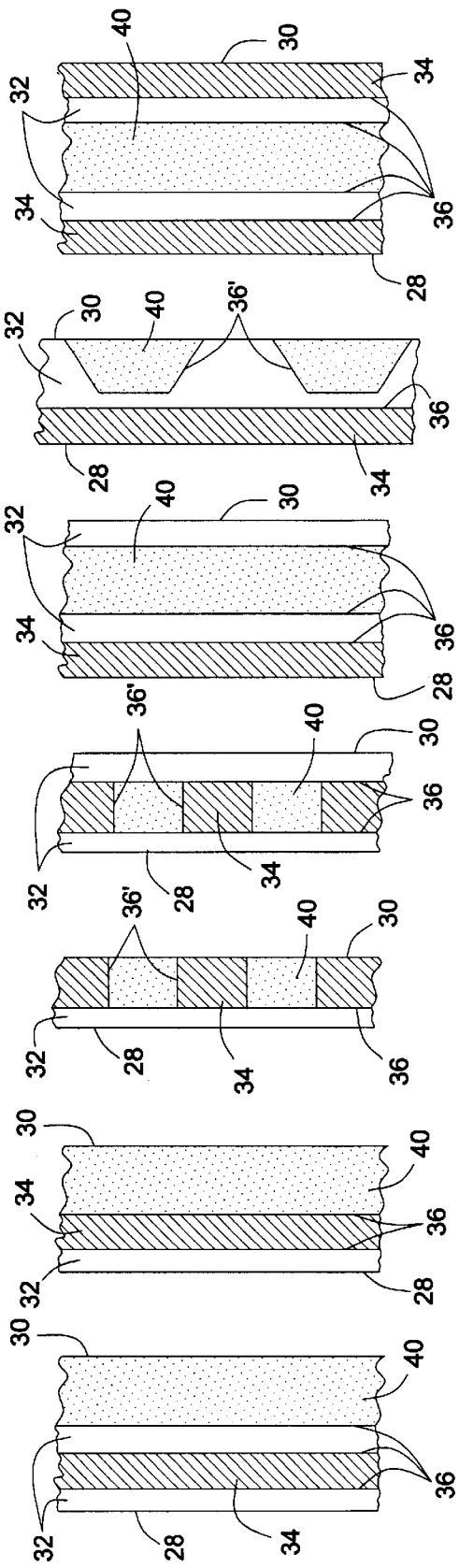

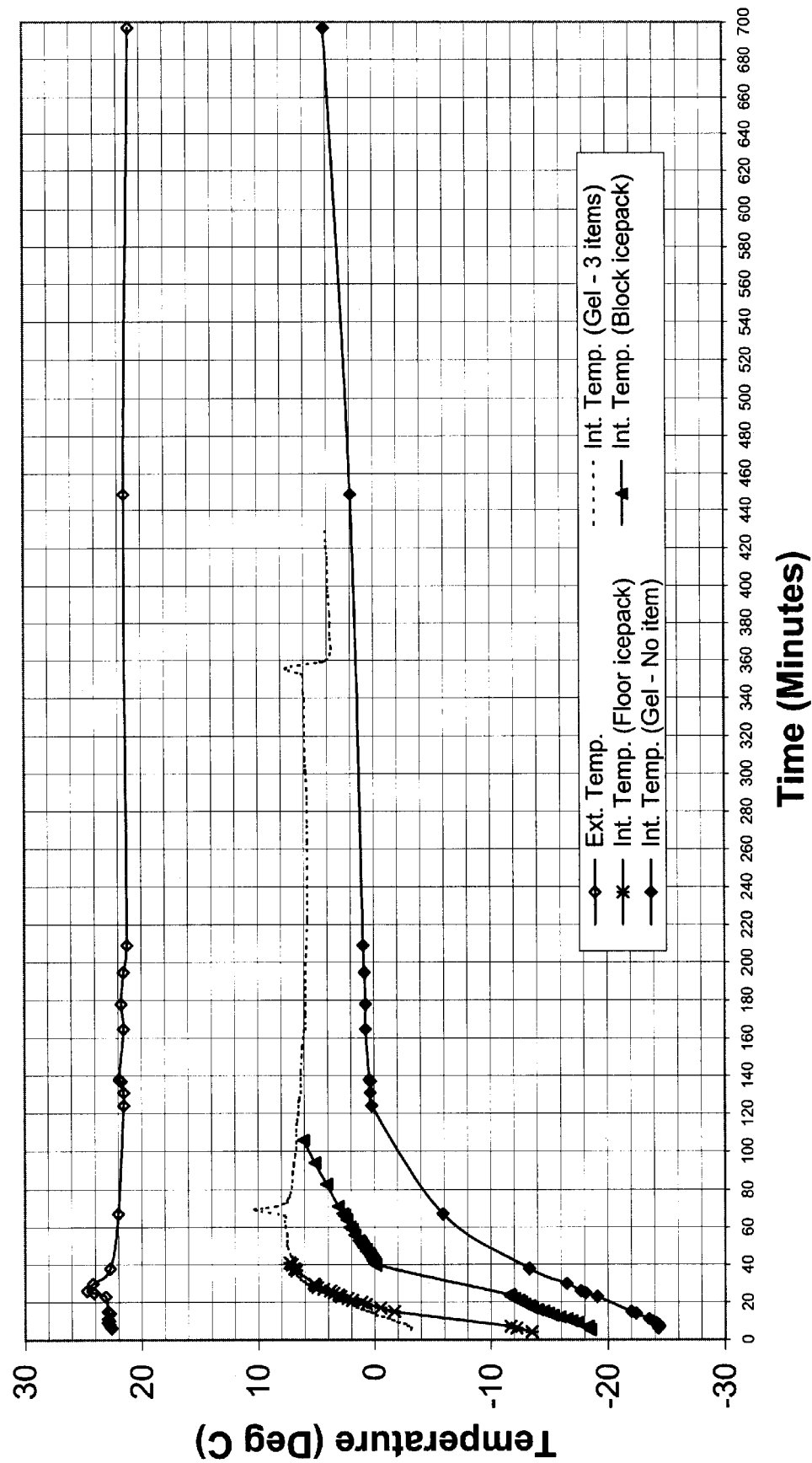

SELF-CONTAINED SILICONE-GEL INSULATED CONTAINER

CROSS-REFERENCE TO RELATED APPLICATION

Benefit of U.S. Provisional Application Serial No. 60/354,972, filed on Feb. 11, 2002, is hereby claimed.

FIELD OF THE INVENTION

The present invention concerns insulated containers, more particularly self-contained insulated containers for maintaining an item at a predetermined temperature.

BACKGROUND OF THE INVENTION

Insulated containers for storing perishable items such as foodstuff and medical specimens at predetermined temperatures are well known and widely used. Typically, the containers include an insulating wall that surrounds the item and an insulated lid, which fits in a sealing arrangement onto the container to maintain an internal container temperature. The insulating wall may be constructed of solid foam like insulator such as polymeric foam or the wall may contain an evacuated airspace such as that found in Thermos flasks. Also, for keeping foodstuff chilled in an ice chest, for example, for use on a picnic, ice packs are available which must first be frozen before adding to the insulated container along with the foodstuff. This relatively simple method does, however, suffer from a number of significant disadvantages. Most of the insulating materials used serve only as thermal insulators and do not have any significant heat capacity. As such, they are inefficient at maintaining the internal temperature of the container for a prolonged period of time. Furthermore, some containers can either accumulate or retain heat, but are not transportable as such. These usually fit within a larger container, or include their own power system to control the temperature therein. Also, for applications such as a freezer or a kitchen stove or the like, the insulating walls do not accumulate or retain the heat to minimize the heat transfer with the environment.

Thus, there is a need for an insulator for use with a container which is self-contained and which insulates pre heated or pre-cooled items for an extended period of time.

SUMMARY OF THE INVENTION

The inventor has unexpectedly discovered that an aqueous mixture of silicone-gel material, when sandwiched between two sealed walls, forms an insulator, which if it surrounds an item having a predetermined temperature, maintains the item at the predetermined temperature for a significant period of time (up to many hours for a cold item). Advantageously, a container that includes the insulator has significantly improved insulating properties and when pre-cooled or pre-heated, maintains an internal storage temperature for an extended period of time. Foodstuff that is pre-heated or pre-cooled can be stored for extended periods in the container and the container will maintain the internal temperature for the extended period. Other applications include, but are not limited to, the use of the container for transporting human organs for transplant or for transporting other perishable medical specimens. Desirably, the material can be used to increase the energy efficiency of appliances such as refrigerators or stoves, ovens, freezers and water tanks, by insulating the outer shell with the material. One may also contemplate the use of this material in the building trade to provide effective insulation in the walls' cavities.

Advantageously, the silicone-gel mixture is an inert, non-toxic, biodegradable, and non-adhesive aqueous silicone-gel that also has heat/cold accumulating properties otherwise known as Phase Change Material (PCM), which minimizes heat exchange from the container to the surrounding environment.

According to a first aspect of the present invention, there is provided a self-contained insulated container for maintaining an item at a predetermined temperature, the container having an inner sidewall and an outer sidewall, the sidewalls being spaced apart from each other and closed off to define an insulating chamber therebetween, the container comprises:

a storage area for receiving the item therein, the storage area being defined by the inner sidewall, the storage area being at a first storage temperature;

the insulating chamber being substantially filled with a first insulating material, the first insulating material being an aqueous silicone-gel mixture, the first insulating material being at a first insulating temperature, the storage area attaining a second storage temperature after the item is placed therein, the first insulating material maintaining the second storage temperature and the item at the predetermined temperature for a storage period.

In one embodiment, the first insulating material is located centrally in the insulating chamber, the first insulating material having first and second air spaces on each side of the first insulating material, the first air space being adjacent the inner sidewall and second air space being adjacent the outer sidewall.

Typically, first and second sectional walls are located between the first insulating material and the first and second air spaces.

Typically, a second insulating material is located on either side of the first and second air spaces, the second insulating material being respectively adjacent the inner sidewall and the outer sidewall.

In one embodiment, the container is a generally closable container and defines side panels, a floor panel, and an openable lid panel, at least one of the side, floor and lid panels including the insulating chamber.

According to a second aspect of the present invention, there is provided an insulator liner for use with a container having an inner sidewall and an outer sidewall, the sidewalls being closed off and defining an insulating chamber therebetween, the container being for storing a pre-heated or a pre-cooled item, the insulator liner comprises:

an insulating material, the insulating material being made from an aqueous silicone-gel mixture, the material substantially filling the insulating chamber, the insulating material being at a first insulating temperature; and a storage area defined by the inner sidewall being at a first storage temperature, the storage area attaining a second storage temperature after the item is placed therein, the insulating material maintaining the second storage temperature and the item at a pre-cooled or a pre-heated temperature for a storage period.

According to a third aspect of the present invention, there is provided a method of maintaining the second storage temperature and the predetermined temperature of a pre-cooled item for an extended storage period in the self-contained insulated container as described hereinabove, the method comprises:

insulating the pre-cooled item in the container, the container being pre-cooled to attain the first insulating temperature and the first storage temperature, the storage area attaining the second storage temperature after the pre-cooled item is placed therein, so as to maintain, for the storage period, the second storage temperature and the pre-cooled item at the pre-determined temperature.

Other objects and advantages of the present invention will become apparent from a careful reading of the detailed description provided herein, with appropriate reference to the accompanying drawings.

BRIEF DESCRIPTION OF THE DRAWINGS

In the annexed drawings, like reference characters indicate like elements throughout.

FIG. 1 is a perspective view, showing an embodiment of a food container unit including a insulator liner in accordance with the present invention;

FIG. 1a is a partial section view taken along line 1a–1a of FIG. 1;

FIG. 2 is a perspective partial cutaway view of another embodiment of the insulator liner used in a freezer in accordance with the present invention;

FIG. 3 is a perspective partial cutaway view of another embodiment of the insulator liner used with a stove in accordance with the present invention;

FIGS. 4 through 16 are partial section views, showing different panel arrangements including the insulator liner;

FIG. 17 is a graphical representation showing the differences between an external temperature (open diamonds), the internal (or storage) temperature for a pre-cooled silicone-gel insulated container with an insulated lid (solid diamonds), the internal temperature for a pre-cooled conventionally insulated container having a pre-cooled floor covering icepack therein with a non-insulated lid (stars), the internal temperature for a pre-cooled conventionally insulated container having a pre-cooled block-shaped icepack therein with a non-insulated lid (solid triangles), and the internal temperature with a plurality of items, including 1 liter of water at room temperature, placed therein with an insulated lid (dotted line)

DETAILED DESCRIPTION OF THE PREFERRED EMBODIMENTS

Figure 18:
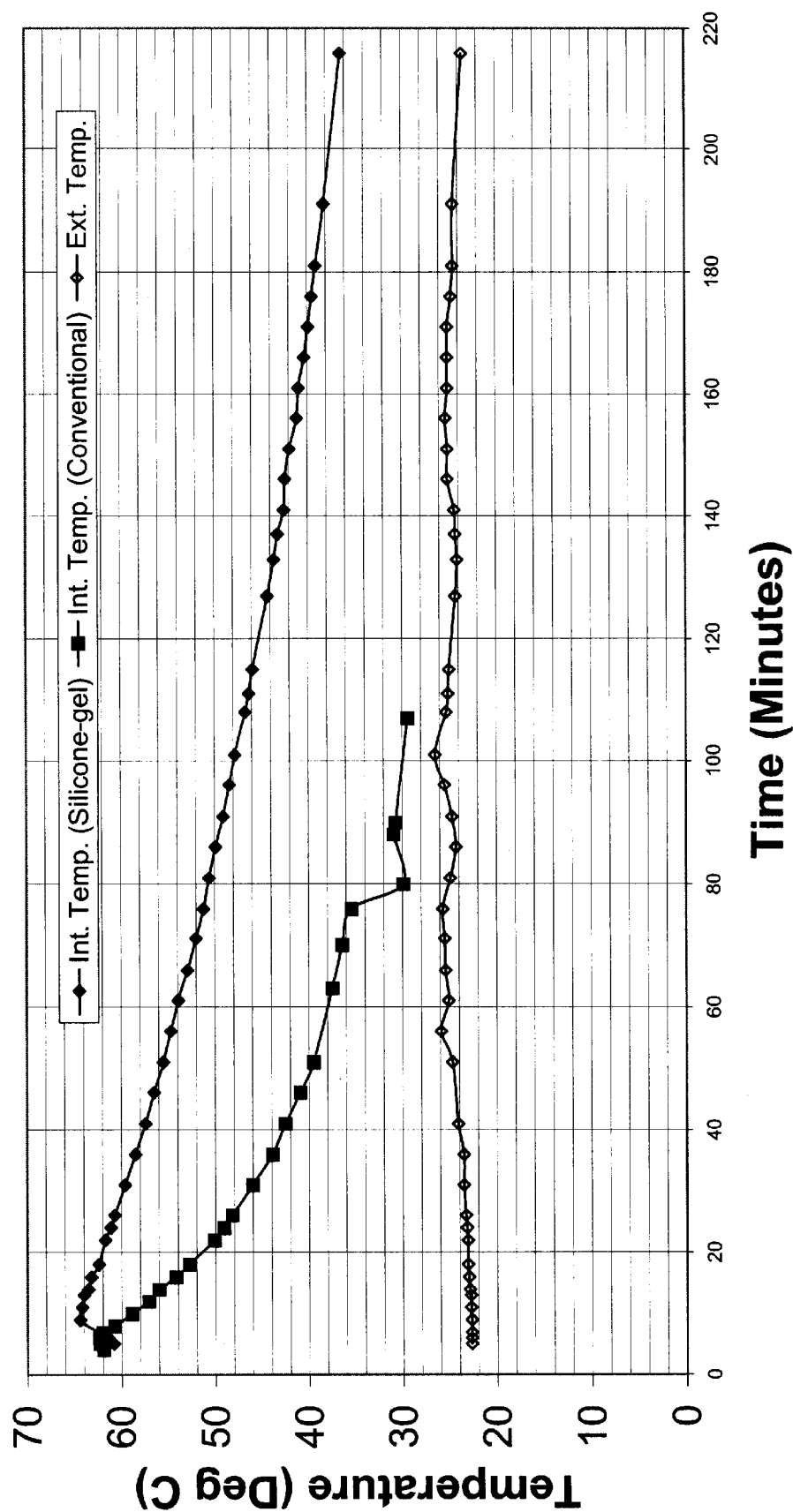
FIG. 18 is a graphical representation showing the differences between an external temperature (open diamonds), the internal (or storage) temperature for a pre-heated conventionally insulated container having a pre-heated item therein with a non-insulated lid (solid squares) and the internal temperature for a pre-heated silicone-gel insulated container having a pre-heated item therein with an insulated lid (solid diamonds).

With reference to the annexed drawings the preferred embodiments of the present invention will be herein described for indicative purposes and by no means as of limitation.

Referring now to FIGS. 1 through 3, there is illustrated an embodiment of an insulator (or insulator liner) 40 in accordance with the present invention when used with a food or item storage unit, for example, a lunch box 20, a freezer 20a and a stove 20b, which are illustrated in an open configuration for convenient illustration.

As shown more specifically in FIG. 1, the food storage unit 20 is rectangular in shape and includes four side panels 22, a base plate 24 and a covering lid 26 for access to its contents (not shown) in open configuration. The covering lid 26 may be optionally insulated with material known to those skilled in the art. The side panels 22, the base plate 24 and the lid 26 typically include an exterior sidewall 28 and an interior sidewall 30. As best illustrated in FIG. 1a, the sidewalls 28 and 30 are spaced apart and are sealed at the upper end 31 and form a chamber 33. The chamber 33 may be partially or completely filled with the insulator 40.

The insulator 40 consists of a first insulating material that includes an aqueous silicone-gel mixture. Typically, the aqueous silicone-gel mixture consists of not less than 0.1% silicone-gel by volume and not more than 10% silicone-gel by volume. More typically, the aqueous silicone-gel mixture consists of from 0.5% silicone-gel by volume to 5% silicone-gel by volume. Most typically, the aqueous silicone-gel mixture consists of 2% silicone-gel by volume.

Referring now to FIGS. 4 through 16, a variety of insulating components 32, 34, and 40, which include the insulator liner 40, an air/gas space 32, and second insulation material 34 known to those skilled in the art, for example, polyurethane, expanded polystyrene, polyisocyanurate, fiberglass and the like. These components 32, 34, 40 are separated by sectional walls 36, typically covered with reflective coating(s), and their relative arrangement may vary according to the specific needs of the user. The advantages provided by the insulator liner 40 over conventional forms of insulation material 34 is that it is non-toxic, non-flammable, biodegradable and non-adhesive. Additionally, it has properties that can absorb and retain latent heat and can be either pre-heated or pre-cooled depending on its intended use.

Alternatives

Different arrangements of the insulator liner 40 with other components 32, 34, 36 are specifically depicted in FIGS. 4 through 16; in which the arrangement from the exterior wall 28 to the interior wall 30 typically, and in sequence, include:

the exterior wall 28, the insulator liner 40 and the interior wall 30 (FIG. 4);

the exterior wall 28, an air/gas space 32, a sectional wall 36, the insulator liner 40 and the interior wall 30 (FIG. 5);

the exterior wall 28, an air/gas space 32, a sectional wall 36, the insulator liner 40, a sectional wall 36, an air/gas space 32 and the interior wall 30 (FIG. 6);

the exterior wall 28, insulation 34, a sectional wall 36, the insulator liner 40, a sectional wall 36, an air/gas space 32 and the interior wall 30 (FIG. 7);

the exterior wall 28, insulation 34, a sectional wall 36, the insulator liner 40 and the interior wall 30 (FIG. 8);

the exterior wall 28, insulation 34, a sectional wall 36, an air/gas space 32, a sectional wall 36, the insulator liner 40 and the interior wall 30 (FIG. 9);

the exterior wall 28, an air/gas space 32, a sectional wall 36, insulation 34, a sectional wall 36, an air/gas space 32, a sectional wall 36, the insulator liner 40 and the interior wall 30 (FIG. 10);

the exterior wall 28, an air/gas space 32, a sectional wall 36, insulation 34, a sectional wall 36, the insulator liner 40 and the interior wall 30 (FIG. 11);

the exterior wall 28, an air/gas space 32, a sectional wall 36, horizontally alternating layers of the insulator liner 40 and insulation 34 separated by horizontal sectional walls 36' and the interior wall 30 (FIG. 12);

the exterior wall 28, an air/gas space 32, a sectional wall 36, horizontally alternating layers of the insulator liner 40 and insulation 34 separated by horizontal sectional walls 36', a sectional wall 36, an air/gas space 32 and the interior wall 30 (FIG. 13);

the exterior wall 28, insulation 34, a sectional wall 36, an air/gas space 32, a sectional wall 36, the insulator liner 40, a sectional wall 36, an air/gas space 32 and the interior wall 30 (FIG. 14);

the exterior wall 28, insulation 34, a sectional wall 36, an air/gas space 32 with crenellated application of the insulator liner 40 separated by substantially horizontal sectional walls 36' and the interior wall 30 (FIG. 15); and the exterior wall 28, insulation 34, a sectional wall 36, an air/gas space 32, a sectional wall 36, the insulator liner 40, a sectional wall 36, an air/gas space 32, a sectional wall 36, insulation 34 and the interior wall 30 (FIG. 16).

Combinations of the above listed types of arrangement could be used in alternation and/or in juxtaposition within a single panel, depending of the specific needs and/or requirements for the container 20, 20a, 20b. One skilled in the art will recognize that due to manufacturing and/or design constraints, such as the use of seals and ornamentation, the side panels 22, the base plate 24 and the lid 26 may not be completely covered by the insulator liner 40.

Further applications of the insulator liner 40 could extend to commercial, industrial and residential building complexes in a format yet to be determined, such as rolls, pre-sized flat-like or molded panels or the like, to cover room walls, ceiling and/or floors. Additionally, the insulator liner 40 could eventually replace existing insulating systems on a variety of appliances such as hot water tanks, drink liquid containers, medical-type containers, and the like.

Operation

As illustrated in FIG. 1, and more specifically FIGS. 17 and 18, a user can use the lunch box 20 in one of two ways with a food item (not shown) at a predetermined temperature. If a cold food item is to be maintained at a cool second storage temperature, the container 20 is first placed in a freezer for a pre-determined amount of time, such as up to 48 hours, and typically about 12 hours (overnight). After this cooling period, a first storage temperature in the storage area 35 is attained. Typically, the first storage temperature is −25° C. or more and 10° C. or less. More typically, the first storage temperature is −10° C. or more and 5° C. or less. During the cooling period, the insulating material reaches an insulating temperature, which is typically −25° C. or more and 10° C. or less. More typically, the insulating temperature is −25° C. or more and 5° C. or less. When the generally cold food item at the predetermined temperature, typically at 0° C. or more and 5° C. or less, is placed in the storage area 35, the storage area 35 attains the second storage temperature. Typically, the second storage temperature is −5° C. or more and 10° C. or less. More typically, the second storage temperature is 0° C. or more and 5° C. or less. As is illustrated in FIG. 17, the insulator material 40 insulates the storage area 35 and the food item against excessive warming and maintains the storage area at the second storage temperature for a storage period of up to 12 hours, as opposed to the relatively rapid warm-up obtained using a pre-cooled conventionally insulated lunch box with an icepack therein. This is particularly useful for applications in which the item in the storage area 35 is extremely sensitive to temperatures above 5° C., such as medical specimens. It would be obvious to one skilled in the art that the pre-determined temperature of the item could be around room temperature without departing from the scope of the present invention.

As is illustrated in FIG. 18, if a hot item, for example soup, is to be maintained above an external temperature (typically room temperature of up to 25° C.) of the container 20 external sidewall 28 for an extended period of time, the item is first heated to the predetermined temperature, typically up to about 70° C. and then placed in the storage area 35 of the pre-heated container 20. Typically, the container 20 is pre-heated, such as using a conventional microwave oven or the like, and the insulating material 40 reaches the insulating temperature, which is typically up to about 70° C., and the first storage temperature typically being up to about 70° C. Over time, the storage area 35 attains the second storage temperature. Typically, the second storage temperature is 30° C. or more and 70° C. or less. The results illustrated in FIG. 18 show that for the pre-heated item, there is a more gradual cooling trend of the internal temperature when the container 20 of the present invention is used compared to the cooling trend of a pre-heated conventionally insulated container is used. One skilled in the art will understand that increasing the thickness of the first insulating material will increase the storage period to beyond the approximately 4 hours as illustrated in FIG. 18.

Although the present self-contained silicone-gel insulated container with its insulator liner has been described with a certain degree of particularity, it is to be understood that the disclosure has been made by way of example only and that present invention is not limited to the features of the embodiments described and illustrated herein, but includes all variations and modifications within the scope of the present invention as hereinafter claimed.

I claim:

1. A self-contained insulated container for maintaining an item at a predetermined temperature, said container having an inner sidewall and an outer sidewall, said sidewalls being spaced apart from each other and closed off to define an insulating chamber therebetween, said container comprising:

a storage area for receiving said item therein, said storage area being defined by said inner sidewall, said storage area being at a first storage temperature;

said insulating chamber being substantially filled with a first insulating material, said first insulating material being an aqueous silicone-gel mixture, said first insulating material being at a first insulating temperature, said storage area attaining a second storage temperature after said item is placed therein, said first insulating material maintaining said second storage temperature and said item at said predetermined temperature for a storage period.

2. The container, according to claim 1, wherein said aqueous silicone-gel mixture consists of by volume 0.1% or more silicone-gel and by volume 10% or less silicone-gel.

3. The container, according to claim 2, wherein said aqueous silicone-gel mixture consists of by volume 0.5% or more silicone-gel and by volume 10% or less silicone-gel.

4. The container, according to claim 3, wherein said aqueous silicone-gel mixture consists of 2% silicone-gel by volume.

5. The container, according to claim 1, wherein said first storage temperature is −25° C. or more and said storage temperature is 10° C. or less.

6. The container, according to claim 5, wherein said first storage temperature is −10° C. or more and said storage temperature is 5° C. or less.

7. The container, according to claim 1, wherein said second storage temperature is −5° C. or more and said second storage temperature is 10° C. or less.

8. The container, according to claim 7, wherein said second storage temperature is 0° C. or more and said second storage temperature is 5° C. or less.

9. The container, according to claim 1, wherein said insulating temperature is −25° C. or more and said insulating temperature is 10° C. or less.

10. The container, according to claim 8, wherein said insulating temperature is −25° C. or more and said insulating temperature is 5° C. or less.

11. The container, according to claim 1, wherein said storage period is up to 12 hours.

12. The container, according to claim 1, wherein said predetermined temperature is 0° C. or more and said predetermined temperature is 10° C. or less.

13. The container, according to claim 1, wherein said predetermined temperature is above an external temperature, said external temperature being the temperature exterior of said external sidewall.

14. The container, according to claim 13, wherein said external temperature is up to 25° C.

15. The container, according to claim 13, wherein said predetermined temperature is up to 70° C.

16. The container, according to claim 13, wherein said first storage temperature is up to 70° C.

17. The container, according to claim 13, wherein said first insulating temperature is up to 70° C.

18. The container, according to claim 13, wherein said second storage temperature is from 30° C. or more and said second storage temperature is 70° C. or less.

19. The container, according to claim 13, wherein said storage temperature is up to 4 hours.

20. The container, according to claim 1, wherein said first insulating material is located centrally in said insulating chamber, said first insulating material having first and second air spaces on each side of said first insulating material, said first air space being adjacent said inner sidewall and second air space being adjacent said outer sidewall.

21. The container, according to claim 20, wherein first and second sectional walls are located between said first insulating material and said first and second air spaces.

22. The container, according to claim 20, wherein a second insulating material is located on either side of said first and second air spaces, said second insulating material being respectively adjacent said inner sidewall and said outer sidewall.

23. The container, according to claim 22, wherein third and fourth sectional walls are located between said second insulating material and said first and second air spaces.

24. The container, according to claim 1, wherein said container is a generally closable container and defines side panels, a floor panel, and an openable lid panel, at least one of said side, floor and lid panels including said insulating chamber.

25. The container, according to claim 1, wherein said container is a lunch box.

26. An insulator liner for use with a container having an inner sidewall and an outer sidewall, said sidewalls being closed off and defining an insulating chamber therebetween, said container being for storing a pre-heated or a pre-cooled item, said insulator liner comprising:

an insulating material, said insulating material being made from an aqueous silicone-gel mixture, said material substantially filling said insulating chamber, said insulating material being at a first insulating temperature; and a storage area defined by said inner sidewall being at a first storage temperature, said storage area attaining a second storage temperature after said item is placed therein, said insulating material maintaining said second storage temperature and said item at a pre-cooled or a pre-heated temperature for a storage period.

27. The insulator, according to claim 26, wherein said aqueous silicone-gel mixture consists of by volume more than 0.1% silicone-gel and said aqueous silicone-gel mixture consists of by volume less than 10% silicone-gel.

28. A method of maintaining said second storage temperature and the predetermined temperature of a pre-cooled item for an extended storage period in the self-contained insulated container, according to claim 1, said method comprising:

insulating said pre-cooled item in said container, said container being pre-cooled to attain said first insulating temperature and said first storage temperature, said storage area attaining said second storage temperature after said pre-cooled item is placed therein, so as to maintain, for said storage period, said second storage temperature and said pre-cooled item at said predetermined temperature.

29. The method, according to claim 28, wherein said predetermined temperature is 0° C. or more and said predetermined temperature is 10° C. or less.

30. The method, according to claim 28, wherein said first storage temperature is −25° C. or more and said storage temperature is 10° C. or less.

31. The method, according to claim 28, wherein said second storage temperature is −5° C. or more and said second storage temperature is 10° C. or less.

32. The method, according to claim 28, wherein said storage period is up to 12 hours.

* * * * *